United States Patent
Cruz et al.

(10) Patent No.: US 6,862,802 B2
(45) Date of Patent: Mar. 8, 2005

(54) SPACER KEY USED FOR INSTALLATION OF A HEAD GIMBAL ASSEMBLY (HGA)

(75) Inventors: Dennis Q. Cruz, Oklahoma City, OK (US); Darrell R. Johnson, Edmond, OK (US); Mark L. Simpson, Yukon, OK (US); Jason P. Delaney, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 87 days.

(21) Appl. No.: 10/186,791

(22) Filed: Jun. 28, 2002

(65) Prior Publication Data

US 2003/0154595 A1 Aug. 21, 2003

Related U.S. Application Data

(60) Provisional application No. 60/357,758, filed on Feb. 19, 2002.

(51) Int. Cl.[7] .............................................. B23P 19/00
(52) U.S. Cl. ............................ 29/737; 29/757; 29/758; 29/603.03; 29/603.01
(58) Field of Search ......................... 29/757, 758, 737, 29/729, 603.03, 603.01, 270, 271, 278; 360/244.1–244.6, 245.1–245.6, 128

(56) References Cited

U.S. PATENT DOCUMENTS

| 4,724,500 | A | * | 2/1988 | Dalziel ..................... 360/245.7 |
| 4,939,611 | A | * | 7/1990 | Connolly ................. 360/265.1 |
| 5,255,422 | A | * | 10/1993 | Russo et al. ................... 29/268 |
| 5,465,476 | A | | 11/1995 | Krajec et al. |
| 5,540,542 | A | | 7/1996 | Krajec et al. |
| 5,550,694 | A | * | 8/1996 | Hyde ....................... 360/265.6 |
| 5,764,444 | A | * | 6/1998 | Imamura et al. .......... 360/294.4 |
| 5,966,271 | A | * | 10/1999 | Fahley ..................... 29/603.03 |
| 5,969,904 | A | * | 10/1999 | Alt et al. .................. 360/245.4 |
| 5,969,906 | A | * | 10/1999 | Arya et al. .................. 360/245 |
| 6,052,258 | A | * | 4/2000 | Albrecht et al. .......... 360/245.2 |
| 6,085,410 | A | | 7/2000 | Toensing et al. |
| 6,163,439 | A | | 12/2000 | Jeong |
| 6,212,759 | B1 | | 4/2001 | Liu et al. |
| 6,295,717 | B1 | | 10/2001 | Chuang et al. |
| 6,297,934 | B1 | * | 10/2001 | Coon ......................... 360/266 |
| 6,297,943 | B1 | * | 10/2001 | Carson ....................... 361/500 |
| 6,388,842 | B1 | | 5/2002 | Murphy |

* cited by examiner

*Primary Examiner*—Carl J. Arbes
*Assistant Examiner*—Tai Van Nguyen
(74) *Attorney, Agent, or Firm*—Randall K. McCarthy; Jennifer M. Buenzow

(57) ABSTRACT

An apparatus for use in attaching a head gimbal assembly (HGA) onto an actuator arm of an actuator assembly during an HGA installation process. The apparatus includes, a central body portion with a base support surface; and a pair of support arms extending from the central body portion forming a channel sized to accommodate expansion of an attachment aperture of an actuator arm during the installation process. Each support arm includes, a first and second support surface offset from and parallel to the base support surface. A first support arm thickness is formed between the first support surface and the base support surface, while a second support arm thickness is formed between the second support surface and the base support having a thickness less than the first support arm thickness. Each support arm thickness supports a corresponding HGA adjacent actuator arm during the installation process.

9 Claims, 5 Drawing Sheets

SPACER KEY USED FOR INSTALLATION OF A HEAD GIMBAL ASSEMBLY (HGA)

RELATED APPLICATIONS

This application claims the benefit of U.S. Provisional Application No. 60/357,758 entitled HGA COMPRESSION-INSTALL SPACER KEY filed Feb. 19, 2002.

FIELD OF THE INVENTION

The claimed invention relates generally to disc drive data storage devices and more particularly, but without limitation, to the attachment of a disc drive head gimbal assembly (HGA) to a rigid actuator arm.

BACKGROUND

Disc drives are digital data storage devices which store and retrieve large amounts of user data in a fast and efficient manner. The data are magnetically recorded on the surfaces of one or more rigid data storage discs affixed to a spindle motor for rotation at a constant high speed. The discs and spindle motor are commonly referred to as a disc stack.

The disc stack is accessed by an array of aligned data transducing heads which are controllably positioned by an actuator assembly. Each head typically includes electromagnetic transducer read and write elements which are carried on an air bearing slider. The slider acts in a cooperative hydrodynamic relationship with a thin layer of air dragged along by the spinning discs to fly each head in a closely spaced relationship to the disc surface.

A typical actuator assembly includes a central body which pivots about an actuator axis adjacent the outermost diameter of the disc stack. Rigid actuator arms project from the central body into the disc stack, and flexible suspension assemblies (flexures) project from the ends of the actuator arms to support the heads.

The flexures bias the heads toward the disc surfaces and include gimbal features that allow the heads to rotate about three axes (pitch, yaw and roll). Each set of heads, gimbals and flexures is referred to as a head gimbal assembly (HGA). The HGAs are affixed to the ends of the actuator arms using any number of suitable processes including swaging, adhesive, compression (with split actuator arms), etc.

An actuator coil of a voice coil motor (VCM) projects from the central body substantially opposite the actuator arms and is immersed in a magnetic field of the VCM. Application of current to the coil causes the actuator to pivot about the actuator axis and move the heads across the disc surfaces. A servo control circuit uses embedded servo data written to the discs to detect head position and generate the requisite coil current to adjust the positions of the heads as desired during operation.

One common prior art approach to writing servo data has involved installing the discs into a disc drive and using a servo track writer (STW) to write the servo data to the discs. Current generations of disc drives are increasingly using multiple disc writer (MDW) stations to write the servo data to the discs at a production facility prior to installation of the discs into the drives.

An MDW station operates similarly to a disc drive but makes use of several actuator assemblies and several discs to achieve increased production efficiencies. An MDW station can also write the servo data in a gaseous environment having a lower density than ambient air (such as helium) in order to achieve higher yields and/or faster throughput. A typical MDW of the current generation has a capacity on the order of around 10–15 discs. As with disc drives, MDW stations use actuator assemblies with actuator arms and HGAs to write the servo data to the discs.

Specially configured tooling is typically used to install an HGA onto an actuator arm (whether for a disc drive actuator or an MDW actuator). To support the HGA during installation, a support element (spacer key) fits against a base plate of the HGA while the HGA is being attached to the actuator arm.

A presently utilized spacer key configuration has a "compression-slit" design. For this design, the spacer key is essentially a beam with a longitudinal slit along a length of the beam, dividing the beam into an upper section and a lower section. The size of the slit in the spacer key is selected so that the upper and lower sections can be slightly deflected one toward another.

The purpose of the compression-slit design is to account for a difference in a size of a gap between two opposed actuator arms. A first gap size exists when installing a first HGA to the first actuator arm. A second gap size exists when attaching a second HGA to the opposed second actuator arm because the second gap size will differ from the first gap size by a thickness of the HGA.

Problems have arisen with the use of the spacer key of the compression-slit design. As a compromise between two gap sizes, the spacer key typically does not quite fit either gap size properly and thus fails to completely bias the HGAs flush with either actuator arm. Also, after many uses, the spacer key can lose elasticity and thus does not return to the original spacing size.

Thus, the spacer key does not provide full contact with a baseplate of the HGA, which causes the HGAs to be skewed with respect to the actuator arms. This in turn causes relatively large differences to occur in the actuator arm spacing. As a result, the HGAs are not seated flush against the actuator arms and can loosen or become detached during subsequent use.

Although spacer keys of the existing art have been found operable, there remains a continued need in the art for improved configurations that overcome these and other limitations of the existing art.

SUMMARY OF THE INVENTION

The present invention (as embodied herein and as claimed below) is generally directed to an apparatus and method for installing a head gimbal assembly (HGA) onto an actuator arm of an actuator assembly.

In accordance with preferred embodiments, a spacer key is provided comprising a support arm having a base support surface and adjacent first and second support surfaces opposite the base support surface.

The support arm has a first thickness from the first support surface to the base support surface and a second thickness from the second support surface to the base support surface. The second thickness is greater than the first thickness by a distance nominally equal to a thickness of an HGA base plate.

In this way, a selected one of the first and second support surfaces contactingly biases the HGA against an actuator arm while the base support surface contactingly biases a second member adjacent the actuator arm. Preferably, the second member comprises a second actuator arm.

The support arm further preferably comprises a radiused shoulder portion between the first and second support surfaces. The spacer key further preferably comprises a central body portion from which the support arm extends, and a handle which projects from the central body portion to facilitate positioning of the spacer key with respect to the actuator arm.

A number of HGAs are preferably installed onto corresponding actuator arms by placing a first HGA onto a first actuator arm; inserting the spacer key between the first HGA and a second member adjacent the first actuator arm so that the second support surface contactingly biases the first HGA against the first actuator arm and so that the base surface contactingly biases the second member; and attaching the first HGA to the first actuator arm.

As before, the second member preferably comprises a second actuator arm and the method further preferably comprises retracting the spacer key and placing a second HGA onto the second actuator arm in a facing relationship to the first HGA; inserting the spacer key between the first and second HGAs so that the first support surface contactingly biases the first HGA against the first actuator arm and so that the base surface contactingly biases the second HGA against the second actuator arm; and attaching the second HGA to the second actuator arm.

Preferably, each HGA comprises a base plate from which an attachment boss extends and each actuator arm comprises an attachment aperture. Each HGA is thus attached to an actuator arm by applying a force to expand the attachment aperture; inserting the attachment boss into the expanded attachment aperture; and releasing the applied force to cause an inner wall of the HGA attachment aperture to grip the HGA boss and thereby secure the base plate to the actuator arm.

These and various other features and advantages which characterize the claimed invention will become apparent upon reading the following detailed description and upon reviewing the associated drawings.

DETAILED DESCRIPTION

Figure 1:
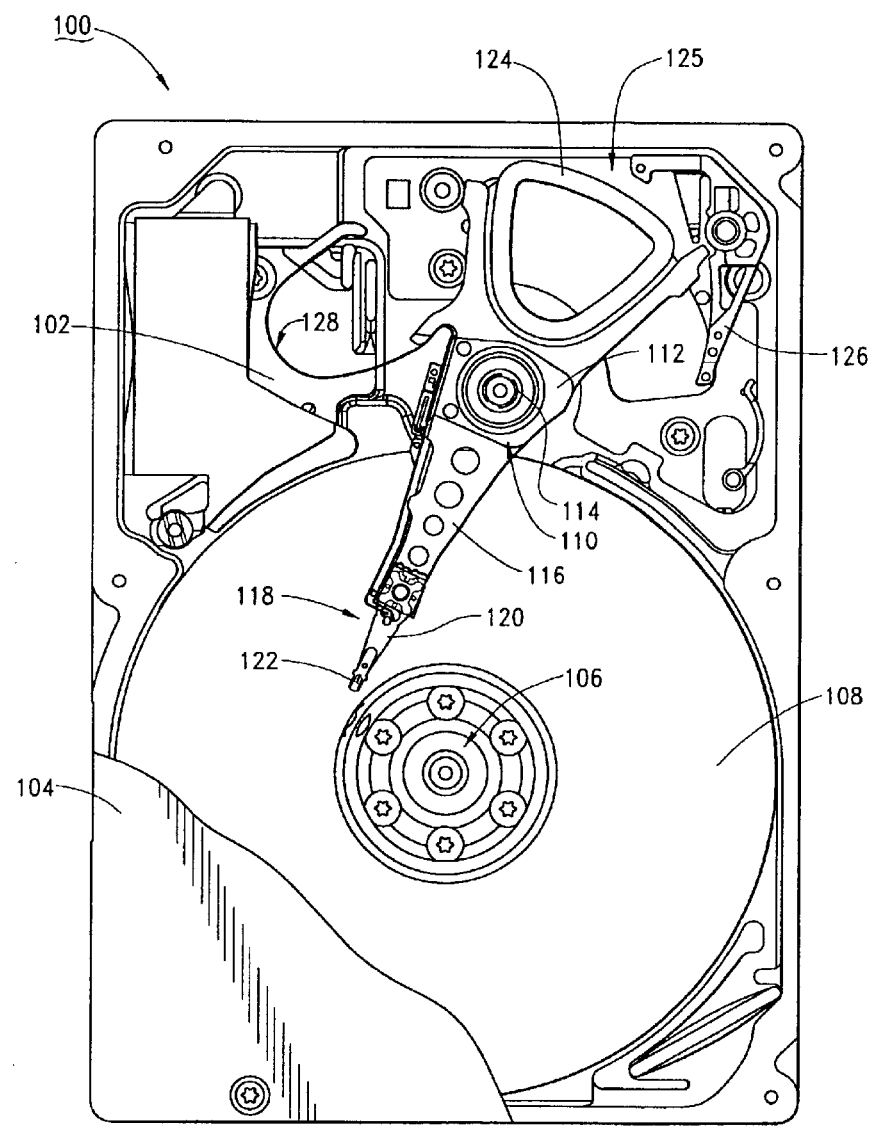
FIG. 1 is a top plan view of a disc drive constructed in accordance with preferred embodiments of the present invention, the disc drive including a number of rotatable discs and an actuator assembly which supports a number of head gimbal assemblies (HGAs).

FIG. 1 provides a top plan view of disc drive data storage device 100 constructed in accordance with preferred embodiments. A base deck 102 and a top cover 104 (shown in partial cutaway) cooperate to form a sealed housing for the disc drive 100.

A spindle motor 106 is mounted to the base deck 102 within the housing and supports a number of rigid data storage discs 108 for rotation at a constant speed. An actuator assembly 110 is mounted to the base deck 102 adjacent the discs 108. The actuator assembly 110 includes a central body 112 configured for rotation about an actuator axis by a cartridge bearing assembly 114.

Rigid actuator arms 116 project from the central body 114 toward the discs 108 and support head gimbal assemblies (HGAs) 118 comprising flexible suspension assemblies (flexures) 120 and data transducing heads 122. The HGAs 118 enable the heads 122 to be supported over the disc surfaces by air currents established by disc rotation.

An actuator coil 124 projects from the central body 112 opposite the actuator arms 116 and is immersed in a magnetic field of a voice coil motor (VCM) 125. Application of current to the coil 124 causes the coil 124 to move within the magnetic field, inducing rotation of the central body 112 about the actuator axis and movement of the heads 122 across the disc surfaces.

For reference, a magnetic toggle latch 126 secures the actuator assembly 110 in a parked position when the disc drive is deactivated, and a flex circuit assembly 128 provides electrical communication paths between the actuator assembly 110 and disc drive electronics mounted to a printed circuit board (PCB) mounted to the underside of the base deck 102.

A servo control circuit (not shown) of the disc drive 100 uses embedded servo data written to the discs 108 in order to control the position of the heads 120 during operation. The servo data are preferably written to the discs using a multiple disc writer (MDW) station which concurrently writes the servo data to a relatively large population (e.g., 10–15) of the discs 108. Once the servo data are written, the appropriate number of discs 108 for the disc drive 100 (e.g., 2–3) are selected and installed into the disc drive 100.

Figure 2:
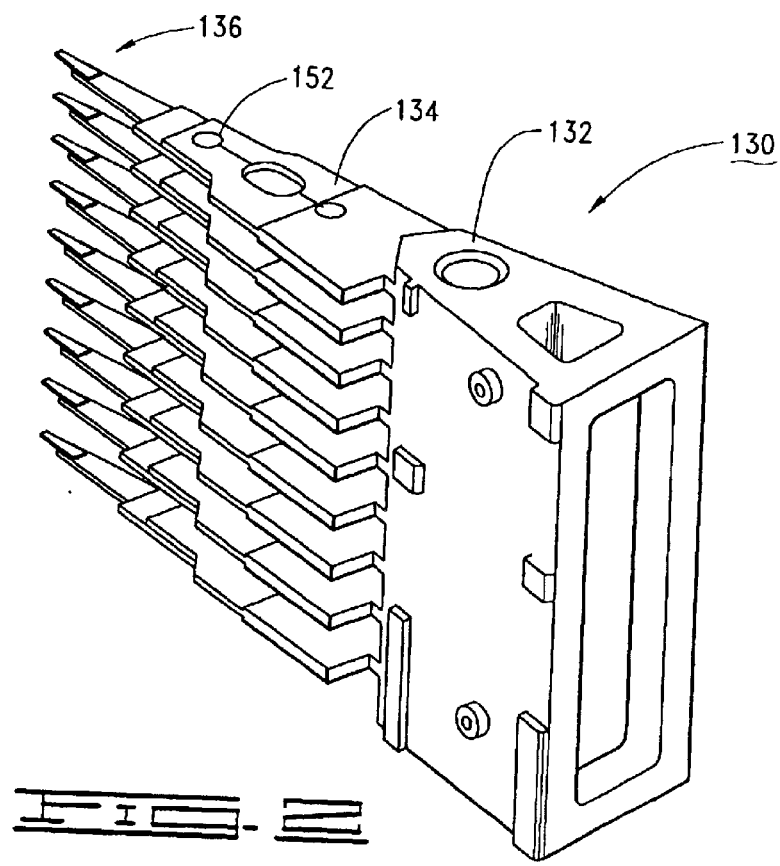
FIG. 2 is an isometric view of an actuator assembly of a multiple disc writer (MDW) station used to write servo data to the discs of the disc drive of FIG. 1.
Figure 3:
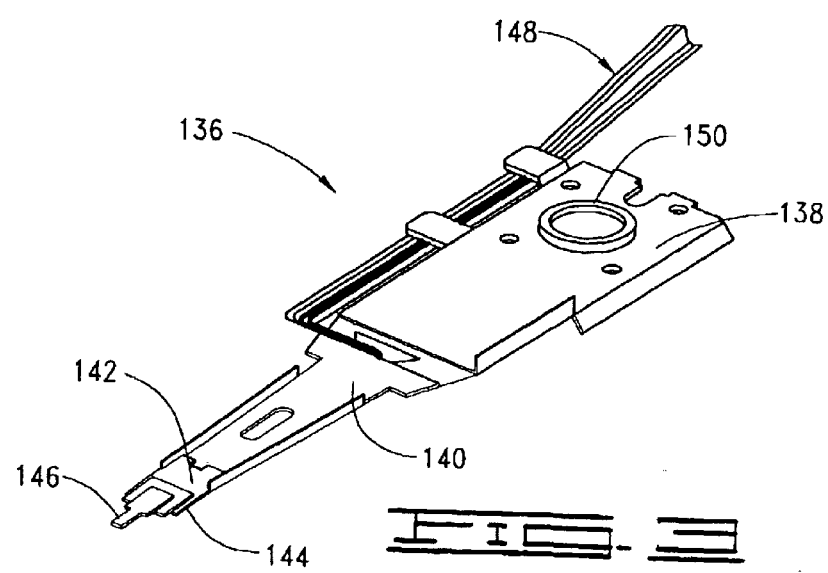
FIG. 3 is an isometric view of a head gimbal assembly (HGA) of the MDW actuator assembly of FIG. 2.

The MDW station employs one or more MDW actuator assemblies 130, such as shown in FIG. 2. The MDW actuator assembly 130 is generally similar to the disc drive actuator assembly 110 of FIG. 1 and includes a central body portion 132, rigid actuator arms 134 and MDW head gimbal assemblies (HGAs) 136. A representative MDW HGA 36 is shown in greater detail in FIG. 3.

The MDW HGA 136 includes a rigid base plate 138, a flexible suspension assembly (flexure) 140, a gimbal portion 142 and a data transducing head 144. A ramp load tab 146 allows the HGA 136 to be offloaded onto a ramp structure (not shown) during nonoperation. Flex on suspension (FOS) conductors 148 are routed as shown to provide electrical communication paths with the head 144.

A substantially cylindrically shaped HGA boss 150 extends from the base plate 138. The boss 150 has an outside diameter slightly larger than a diameter of an HGA attachment aperture 152 of the MDW actuator arm 134 (FIG. 2).

The split construction of the MDW actuator arm 134 allows expansion of the HGA attachment aperture 152 to receive the boss 150, after which the aperture 152 is released to compressingly engage the boss 150 and secure the HGA 136 to the actuator arm 134. While a split construction attachment methodology is preferred, it will be apparent that other attachment methodologies can readily be employed depending upon the requirements of a given application.

Figure 4:
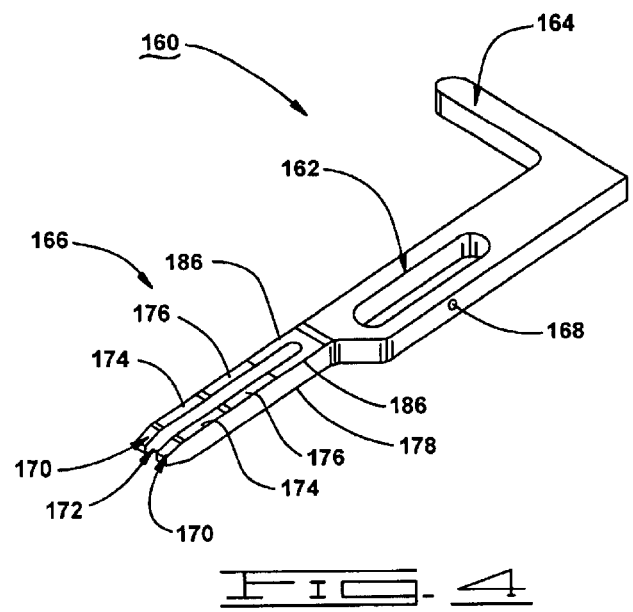
FIG. 4 is an isometric view of a support element (spacer key) operably configured to support the HGA of FIG. 2 during installation onto the MDW station actuator assembly of FIG. 3. The spacer key can also be used to support the HGAs of FIG. 1 during installation onto the disc drive actuator assembly of FIG. 1, as desired.

FIG. 4 shows an isometric view of a support element (spacer key) 160 constructed and used in accordance with preferred embodiments of the present invention to support the MDW HGAs 136 during installation onto the MDW actuator arms 134. It will be recognized, however, that the spacer key 160 can also be used to attach the disc drive HGAs 118 onto the disc drive actuator arms 116, as desired during assembly of the disc drive actuator assembly 110.

The spacer key 160 includes a central body portion 162, a handle portion 164 and a blade portion 166. The handle portion 164 affixes to a positioning shuttle (not shown) for automatic or manual positioning of the spacer key 160. The body portion 162 preferably includes a small detent 168 that indicates and maintains a position of the spacer key with respect to the positioning shuttle.

The blade portion 166 includes parallel cantilevered support arms 170 that form a u-shaped channel 172 to provide clearance and alignment during HGA installation for passage of an HGA attachment tooling, such as a swage tool (not shown), between the support arms 170.

Figure 5:
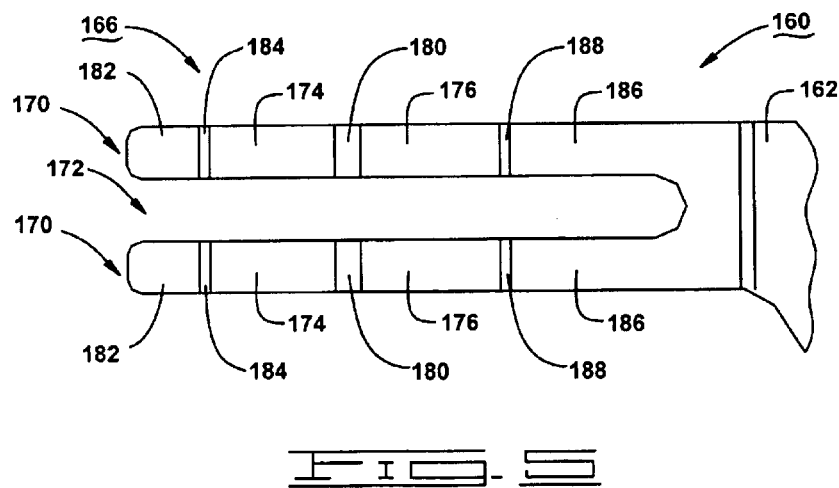
FIG. 5 provides a top plan view of the spacer key of FIG. 4.
Figure 6:
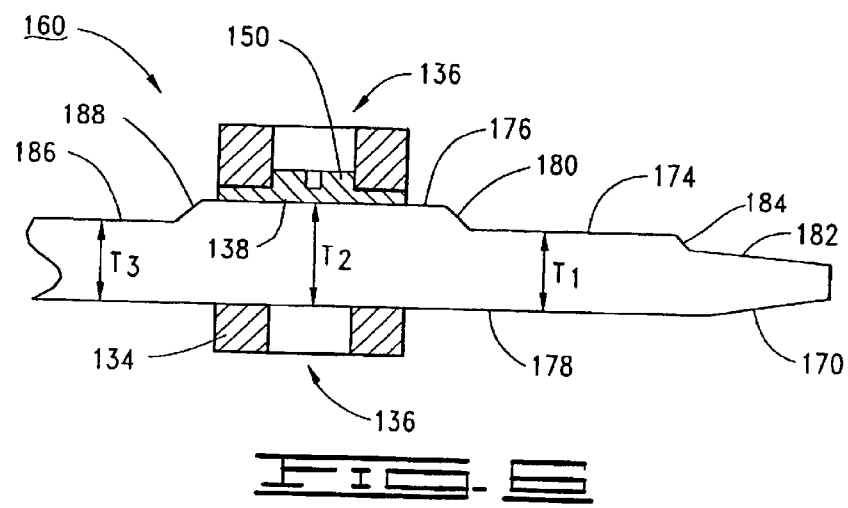
FIG. 6 provides a side elevational, partial cross-sectional view to generally illustrate use of the spacer key of FIG. 4 to support the installation of a first HGA between adjacent actuator arms.
Figure 7:
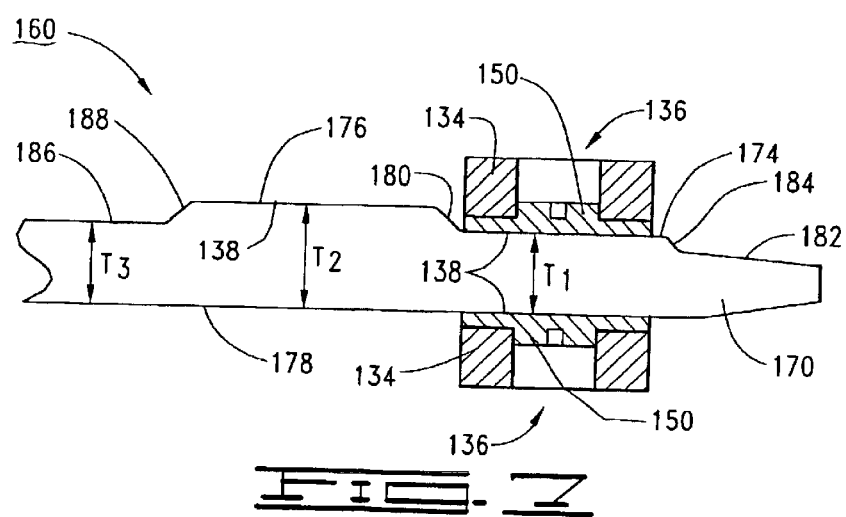
FIG. 7 provides a side elevational, partial cross-sectional view to generally illustrate use of the spacer key of FIG. 4 to support the installation of a second HGA between the actuator arms of FIG. 6.

As further shown in a top plan view of FIG. 5 and side elevational views of FIGS. 6–7, the support arms 170 each include a first support surface 174, a second support surface 176 and a base support surface 178. The first and second support surfaces 174, 176 extend along the top of each support arm 170 and the base support surface 178 extends along the bottom of each support arm 170. The respective first, second and support surfaces 174, 176 and 178 are preferably planar and parallel one with respect to another.

As best shown in FIGS. 6–7, the first support surface 174 and the base support surface 178 are oriented to provide a first thickness T1 of each support arm 170. The second support surface 176 and the base support surface 178 provide a second thickness T2 greater than the first thickness. A radiused shoulder 180 provides a smooth transition between the first and second support surfaces 174, 176.

Each support arm 170 further preferably includes a tapered leading surface 182 with a radiused shoulder 184 between the leading surface 182 and the first surface 174, and a trailing surface 186 with another radiused shoulder 188 between the trailing surface 186 and the second support surface 176. Although a thickness T3 of the support arm 170 between the trailing surface 176 is shown in FIGS. 6–7 to be slightly less than the thickness T2, in an alternative preferred embodiment the thickness T3 can be readily configured to be greater than the thickness T2, as desired.

The thickness T1 is preferably selected to be nominally equal to the distance between two adjacent actuator arms 134 with two interposing HGA base plates 138 (see FIG. 7). The thickness T2 is similarly preferably selected to be nominally equal to the distance between two adjacent actuator arms 134 with one interposing HGA base plate 138 (see FIG. 6). In this way, the difference between thicknesses T1 and T2 is selected to be nominally equal to the thickness of a single HGA base plate 138.

Figure 8:
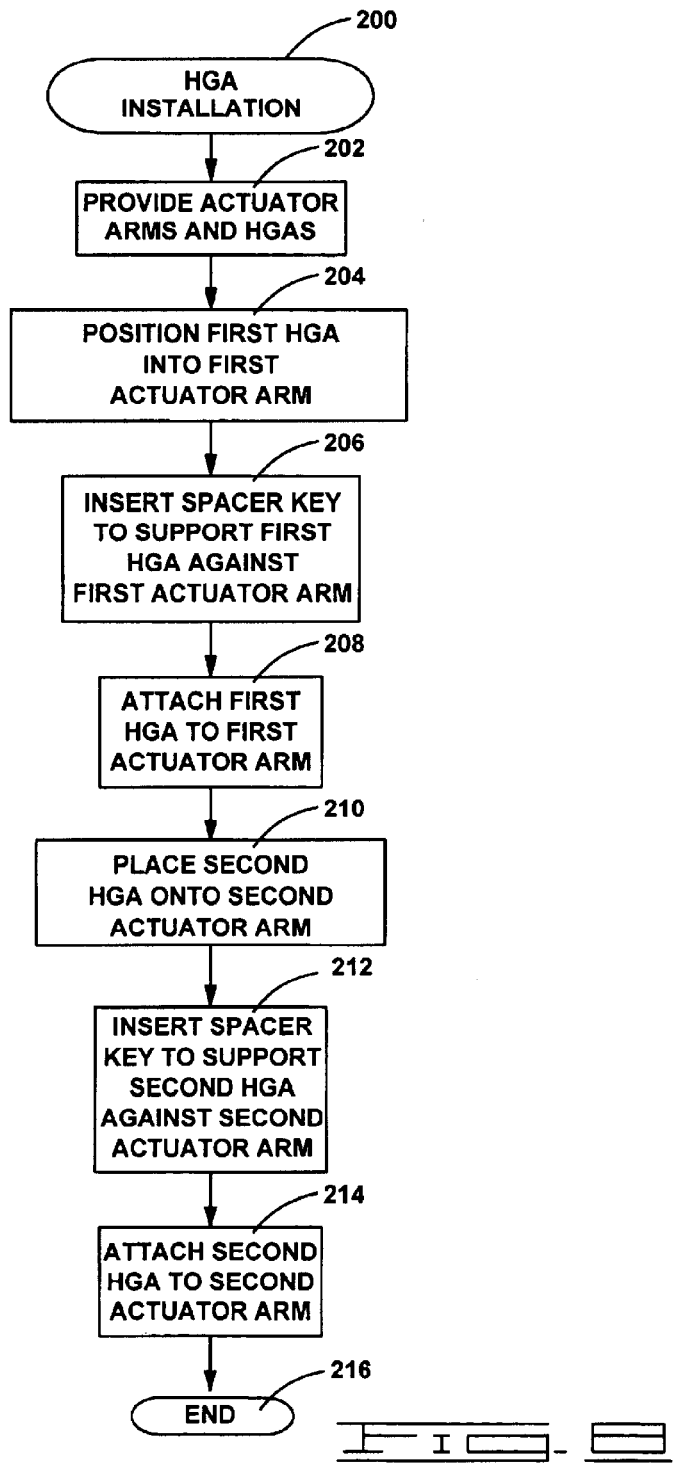
FIG. 8 is an HGA INSTALLATION routine generally illustrative of steps carried out in accordance with preferred embodiments to install HGAs using the spacer key of FIG. 4.

FIG. 8 provides a flow chart for an HGA INSTALLATION routine 200, generally illustrative of steps carried out in accordance with preferred embodiments to install an HGA (such as the MDW HGA 136) onto an actuator arm (such as the MDW actuator arm 134) using the spacer key 160.

The desired actuator arms 134 and HGAs 136 are provided at step 202, and a first HGA 136 is placed onto the first actuator arm 134 at step 204.

The spacer key 160 is inserted at step 206 to bias the base plate 138 of the first HGA 136 against the first actuator arm 134. This is preferably carried out as shown in FIG. 6 so that the second surface 176 abuts the base plate 138 and the base surface 178 abuts an adjacent, second actuator arm 134. The first HGA 134 is then attached to the first actuator arm 134 at step 208 while the spacer key 160 maintains pressing support and alignment of the first HGA 136. The spacer key 160 is then withdrawn.

The flow of FIG. 8 continues to step 210 wherein a second HGA 136 is placed adjacent the second actuator arm 134, and the spacer key 160 is again inserted at step 212 to bias the base plate 138 of the second HGA 136 against the second actuator arm 134. This is preferably carried out as shown by FIG. 7. The second HGA 136 is affixed to the second actuator arm 134 at step 214. Although the routine is shown to then end at step 216, it will be understood that the foregoing steps are repeated as required until all of the HGAs are installed onto associated actuator arms.

It will be noted that, based on the configurations of the disc drive actuator assembly 110 and the MDW actuator assembly 130, HGAs (such as 118, 136) will be typically installed in locations that are between adjacent actuator arms (such as arms 116, 134). However, the spacer key 160 can likewise be used as desired to install an HGA onto an actuator arm without an adjacent actuator arm (such as, for example, in situations where a single actuator arm is used or where actuator arms are subsequently stacked after HGA installation).

In this case the thicknesses T1 and T2 can still readily be advantageously used to properly register the HGA, even if the base surface 178 abuts a second member (such as a precisely located control surface, a base deck, etc.) rather than another actuator arm or HGA base plate.

It will now be understood that the present invention is generally directed to an apparatus and method for installing a head gimbal assembly (HGA) onto an actuator arm of an actuator assembly.

In accordance with preferred embodiments, a spacer key (such as 160) is provided comprising a support arm (such as 170) having a base support surface (such as 178) and adjacent first and second support surfaces (such as 174, 176) opposite the base support surface.

The support arm has a first thickness (such as T1) from the first support surface to the base support surface and a second thickness (such as T2) from the second support surface to the base support surface. The second thickness is greater than the first thickness by a distance nominally equal to a thickness of an HGA (such as 118, 136).

In this way, a selected one of the first and second support surfaces contactingly biases the HGA against an actuator arm (such as 116, 134) while the base support surface contactingly biases a second member adjacent the actuator arm. Preferably, the second member comprises a second actuator arm.

The support arm further preferably comprises a radiused shoulder portion (such as 180) between the first and second support surfaces. The spacer key further preferably comprises a central body portion (such as 162) from which the support arm extends, and a handle (such as 164) which projects from the central body portion to facilitate positioning of the spacer key with respect to the actuator arm.

A number of HGAs are preferably installed onto corresponding actuator arms by placing a first HGA onto a first actuator arm (such as by step 204); inserting the spacer key between the first HGA and a second member adjacent the first actuator arm so that the second support surface contactingly biases the first HGA against the first actuator arm and so that the base surface contactingly biases the second member (such as by step 206); and attaching the first HGA to the first actuator arm (such as by step 208).

As before, the second member preferably comprises a second actuator arm and the method further preferably comprises retracting the spacer key and placing a second HGA onto the second actuator arm in a facing relationship to the first HGA (such as by step 210); inserting the spacer key between the first and second HGAs so that the first support surface contactingly biases the first HGA against the first actuator arm and so that the base surface contactinly biases the second HGA against the second actuator arm (such as by step 212); and attaching the second HGA to the second actuator arm (such as by step 214).

Preferably, the first HGA comprises a base plate (such as 138) from which an attachment boss (such as 150) extends, wherein the first actuator arm comprises an attachment aperture (such as 152), and wherein the step of attaching the first HGA to the first actuator arm comprises applying a force to expand the attachment aperture; inserting the attachment boss into the expanded attachment aperture; and releasing the applied force to cause an inner wall of the first HGA attachment aperture to grip the first HGA boss and thereby secure the base plate to the first actuator arm.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the spacer key without departing from the spirit and scope of the present invention.

In addition, although the embodiments described herein are directed to a spacer key used to affix an HGA onto an actuator arm for a disc drive or MDW station, it will be appreciated by those skilled in the art that the spacer key can be used in other applications including other types of data storage devices without departing from the spirit and scope of the claimed invention.

What is claimed is:

1. A tool acting upon an actuator arm during installation of a head gimbal assembly (HGA) onto the actuator arm, the tool comprising:
    a central body portion with a base support surface; and
    a pair of support arms extending from the central body portion, each support arm comprising:
        a first support surface offset from and parallel to the base support surface to form a first support arm thickness; and
        a second support surface adjacent the first support surface, the second support surface offset from and parallel to the base support surface to form a second support arm thickness, wherein the second support arm thickness is less than the first support arm thickness, and wherein the first thickness is used as a support means interposed between a first HGA and a first arm of an actuator to bias the first HGA adjacent a second arm of the actuator during an attachment of the first head gimbal assembly to the second arm of the actuator.

2. The tool of claim 1, in which the pair of support arms extend from the central body in a first direction forming a channel there between, while a handle extends from the central body in a second direction, wherein the handle provides a tooling fixture mounting means for attachment to a tooling fixture, and wherein the channel is sized to accommodate passage of on HGA attachment tooling during an installation of an HGA onto the actuator arm.

3. The tool of claim 1, in which each support arm comprises a proximal end adjacent the central body and a distal end extending from the proximal end, wherein each distal end provides a support arm lead in portion.

4. The tool of claim 3, in which each support arm comprises a first radiused shoulder interposed between said lead in portion and the first support surface, and a second radiused shoulder interposed between the first support surface and the second support surface.

5. The tool of claim 2, in which the central body portion comprises a tooling fixture locating feature for use in locating the central body portion relative to the tooling fixture.

6. The tool of claim 1, in which the second Thickness is used as a support means interposed between the first HGA biased against the second arm of the actuator and a second HGA to bias the second head gimbal assembly adjacent the first arm of the actuator during an attachment of the second head gimbal assembly to the first arm of the actuator.

7. The tool of claim 6, in which the base support surface slidingly engages the first arm of the actuator while the first support surface biases the first HGA adjacent the second arm of the actuator during attachment of the first HGA to the second arm of the actuator, and wherein the second support surface slidingly engages the first HGA biased adjacent the second arm of the actuator while the base support surface biases the second HGA against the first arm of the actuator during attachment of the second HGA to the first arm of the actuator.

8. The tool of claim 1, in which the central body portion comprises a trailing surface offset from and parallel to the base surface.

9. The tool of claim 8, further comprises a third radiused shoulder interposed between the second support surface and the trailing surface.

* * * * *